(12) United States Patent
Liu et al.

(10) Patent No.: US 9,836,823 B2
(45) Date of Patent: Dec. 5, 2017

(54) METHOD AND DEVICE FOR ENHANCING EDGE OF IMAGE AND DIGITAL CAMERA

(71) Applicant: BYD COMPANY LIMITED, Shenzhen (CN)

(72) Inventors: Huaren Liu, Shenzhen (CN); Shuijiang Mao, Shenzhen (CN); Jingjun Fu, Shenzhen (CN); Wei Feng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/895,351

(22) PCT Filed: May 16, 2014

(86) PCT No.: PCT/CN2014/077712
§ 371 (c)(1),
(2) Date: Dec. 2, 2015

(87) PCT Pub. No.: WO2015/014148
PCT Pub. Date: Feb. 5, 2015

(65) Prior Publication Data
US 2016/0117804 A1  Apr. 28, 2016

(30) Foreign Application Priority Data

Jul. 30, 2013 (CN) .......................... 2013 1 0326884
Mar. 25, 2014 (CN) .......................... 2014 1 0112705

(51) Int. Cl.
H04N 5/217 (2011.01)
G06T 5/00 (2006.01)
(Continued)

(52) U.S. Cl.
CPC .............. *G06T 5/001* (2013.01); *G06T 5/003* (2013.01); *G06T 7/13* (2017.01); *H04N 5/142* (2013.01);
(Continued)

(58) Field of Classification Search
CPC ........ H04N 1/409; H04N 1/4092; H04N 1/58; G06T 2207/20192; G06T 3/403; G06K 9/32; G06K 9/66
(Continued)

(56) References Cited

U.S. PATENT DOCUMENTS 5,457,546 A   10/1995  Hong
6,415,053 B1   7/2002  Norimatsu
(Continued)

FOREIGN PATENT DOCUMENTS

CN       2626003 Y    7/2004
CN    101170641 A    4/2008
(Continued)

OTHER PUBLICATIONS

The World Intellectual Property Organization (WIPO) International Search Report for PCT/CN2014/077712 dated Sep. 3, 2014.
(Continued)

*Primary Examiner* — Kelly L Jerabek
(74) *Attorney, Agent, or Firm* — Anova Law Group, PLLC

(57) ABSTRACT

A method and a device for enhancing an edge of an image are provided. The method includes: obtaining a first gradient value of a pixel; determining whether the pixel is at a rough edge according to the first gradient value; if yes, obtaining a first edge enhancement value of the pixel and obtaining a first edge enhancement result of the pixel according to the first edge enhancement value; if no, obtaining a second gradient value of the pixel; determining whether the pixel is
(Continued)

at a tiny edge according to the second gradient value; if yes, obtaining a second edge enhancement value of the pixel and obtaining a second edge enhancement result of the pixel according to the second edge enhancement value; if no, obtaining the pixel value of the pixel as the edge enhancement result of the pixel; and repeating above steps until each pixel of the image is processed.

20 Claims, 3 Drawing Sheets

(51) Int. Cl.
*H04N 5/14* (2006.01)
*H04N 5/232* (2006.01)
*H04N 5/208* (2006.01)
*H04N 5/357* (2011.01)
*G06T 7/13* (2017.01)
*G06K 9/32* (2006.01)

(52) U.S. Cl.
CPC ......... *H04N 5/208* (2013.01); *H04N 5/23235* (2013.01); *H04N 5/357* (2013.01); *G06T 2207/20192* (2013.01)

(58) Field of Classification Search
USPC ............... 348/241, 252, 222.1; 382/298–300
See application file for complete search history.

(56) References Cited

U.S. PATENT DOCUMENTS

| 7,251,053 | B1 | 7/2007 | Yoshida | |
| 7,567,724 | B2* | 7/2009 | Gomi | G06K 9/4609 348/610 |
| 2005/0030586 | A1 | 2/2005 | Huang | |
| 2005/0105826 | A1 | 5/2005 | Yang et al. | |
| 2006/0245666 | A1* | 11/2006 | Petrosyan | G06T 5/002 382/275 |
| 2009/0022402 | A1* | 1/2009 | Lee | G06T 3/4007 382/195 |
| 2009/0245661 | A1* | 10/2009 | Ilbery | H04N 19/33 382/233 |
| 2010/0142830 | A1* | 6/2010 | Yahata | G06F 3/042 382/209 |
| 2010/0322536 | A1 | 12/2010 | Tezuka | |

FOREIGN PATENT DOCUMENTS

| CN | 101551456 A | 10/2009 |
| CN | 101727659 A | 6/2010 |
| JP | 2000011188 A | 1/2000 |

OTHER PUBLICATIONS

Jin, Pengfei. "Improved algorithm for Sobel edge detection of image." Journal of Applied Optics., vol. No. 4, No. vol. 29, Jul. 31, 2008, ISSN: pp. 626-627.

* cited by examiner

| P (i-2, j-2) | P (i-2, j-1) | P (i-2, j) | P (i-2, j+1) | P (i-2, j+2) |
| --- | --- | --- | --- | --- |
| P (i-1, j-2) | P (i-1, j-1) | P (i-1, j-1) | P (i-1, j+1) | P (i-1, j+2) |
| P (i, j-2) | P (i, j-1) | P (i, j) | P (i, j+1) | P (i, j+2) |
| P (i+1, j-2) | P (i+1, j-1) | P (i+1, j) | P (i+1, j+1) | P (i+1, j+2) |
| P (i+2, j-2) | P (i+2, j-1) | P (i+2, j) | P (i+2, j+1) | P (i+2, j+2) |

Fig. 3

| P (i-1, j-1) | P (i-1, j-1) | P (i-1, j+1) |
| --- | --- | --- |
| P (i, j-1) | P (i, j) | P (i, j+1) |
| P (i+1, j-1) | P (i+1, j) | P (i+1, j+1) |

Fig. 4

METHOD AND DEVICE FOR ENHANCING EDGE OF IMAGE AND DIGITAL CAMERA

CROSS-REFERENCE TO RELATED APPLICATION

This application is a national phase entry under 35 U.S.C. §371 of International Application No. PCT/CN2014/077712, filed on May 16, 2014, which claims priority to and benefits of Chinese Patent Application Serial No. 201310326884.5, filed with the State Intellectual Property Office of P. R. China on Jul. 30, 2013, and Chinese Patent Application Serial No. 201410112705.2, filed with the State Intellectual Property Office of P. R. China on Mar. 25, 2014, the content of all of which are incorporated herein by reference.

FIELD

The present disclosure relates to an image processing technology and, in particular, relates to a method and a device for enhancing an edge of an image and a digital camera comprising the device.

BACKGROUND

During digital image processing, detail information of the image needs to be fully displayed, and thus an edge enhancement is required. The edge of the image refers to an area of the image which has an obvious brightness variation.

Nowadays, there are a lot of methods for enhancing the edge of the image, for example, Sobel algorithm, Robert algorithm, Robinson algorithm, Laplace algorithm, etc., in which Sobel algorithm is most commonly used.

Sobel algorithm has advantages of simplicity and fast processing speed. However, the resolution of the processed image using the Sobel algorithm is low.

SUMMARY

The purpose of the present disclosure is to solve at least one of the problems existing in the prior art to at least some extent.

According to embodiments of a first aspect of the present disclosure, a method for enhancing an edge of an image is provided. The method includes: obtaining a first gradient value of a pixel of the image; determining whether the pixel is at a rough edge according to the first gradient value of the pixel; if the pixel is at the rough edge, obtaining a first edge enhancement value of the pixel, and obtaining a first edge enhancement result of the pixel according to the first edge enhancement value of the pixel; if the pixel is not at the rough edge, obtaining a second gradient value of the pixel; determining whether the pixel is at a tiny edge according to the second gradient value of the pixel; if the pixel is at the tiny edge, obtaining a second edge enhancement value of the pixel, and obtaining a second edge enhancement result of the pixel according to the second edge enhancement value of the pixel; if the pixel is not at the tiny edge, obtaining the pixel value of the pixel as the edge enhancement result of the pixel; and repeating above steps until each pixel of the image is processed.

According to embodiments of a second aspect of the present disclosure, another method for enhancing an edge of an image is provided. The method includes: obtaining a first gradient value and a second gradient value of a pixel of the image simultaneously; determining whether the pixel is at a tiny edge or at a rough edge according to the first gradient value and the second gradient value; if the pixel is at the rough edge, obtaining a first edge enhancement value of the pixel and obtaining a first edge enhancement result of the pixel according to the first edge enhancement value of the pixel; if the pixel is at the tiny edge, obtaining a second edge enhancement value of the pixel and obtaining a second edge enhancement result of the pixel according to the second edge enhancement value of the pixel; if the pixel is neither at the rough edge nor at the tiny edge, obtaining the pixel value of the pixel as the edge enhancement result of the pixel; and repeating above steps until each pixel of the image is processed.

With the method for enhancing an edge of an image according to embodiments of the present disclosure, by performing not only the rough edge detection but also the tiny edge detection, and by obtaining the edge enhancement result according to the result of the rough edge detection and the tiny edge detection, detail information of the image can be increased, and thus the resolution of the image is improved.

According to embodiments of a third aspect of the present disclosure, a device for enhancing an edge of an image is provided. The device includes: a first detecting module, configured to obtain a first gradient value of a pixel of the image; a second detecting module, configured to obtain a second gradient value of the pixel; a determining module, connected with the first detecting module and the second detecting module respectively, and configured to determine whether the pixel is at a rough edge according to the first gradient value of the pixel and to determine whether the pixel is at a tiny edge according to the second gradient value of the pixel; a obtaining module, connected with the determining module, and configured to obtain an edge enhancement value of the pixel according to an determining result of the determining module; and an enhancing module, connected with the obtaining module, and configured to obtain an edge enhancement result of the pixel according to the edge enhancement value of the pixel.

With the device for enhancing an edge of an image according to embodiments of the present disclosure, by performing not only the rough edge detection but also the tiny edge detection, and by obtaining the edge enhancement result according to the result of the rough edge detection and the tiny edge detection, detail information of the image can be increased, and thus the resolution of the image is improved.

According to embodiments of a fourth aspect of the present disclosure, a digital camera is provided. The digital camera includes: the device for enhancing an edge of an image according to embodiments of the third aspect of the present disclosure; a switch, connected with the device for enhancing the edge of the image; and a register, connected with the switch, and configured to control the switch to turn on or off.

With the digital camera according to embodiments of the present disclosure, by controlling the switch to turn on to connect with the device for enhancing the edge of the image if necessary and controlling the switch to turn off to bypass the device for enhancing the edge of the image if not necessary, a resolution of the image generated by the digital camera can be enhanced effectively.

Additional aspects and advantages of embodiments of present disclosure will be given in part in the following descriptions, become apparent in the part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 3 is a schematic diagram showing a first matrix established by taking a pixel P(i,j) as a center according to an embodiment of the present disclosure;

FIG. 4 is a schematic diagram showing a second matrix established by taking the pixel P(i,j) as a center according to an embodiment of the present disclosure;

DETAILED DESCRIPTION

Figure 1:
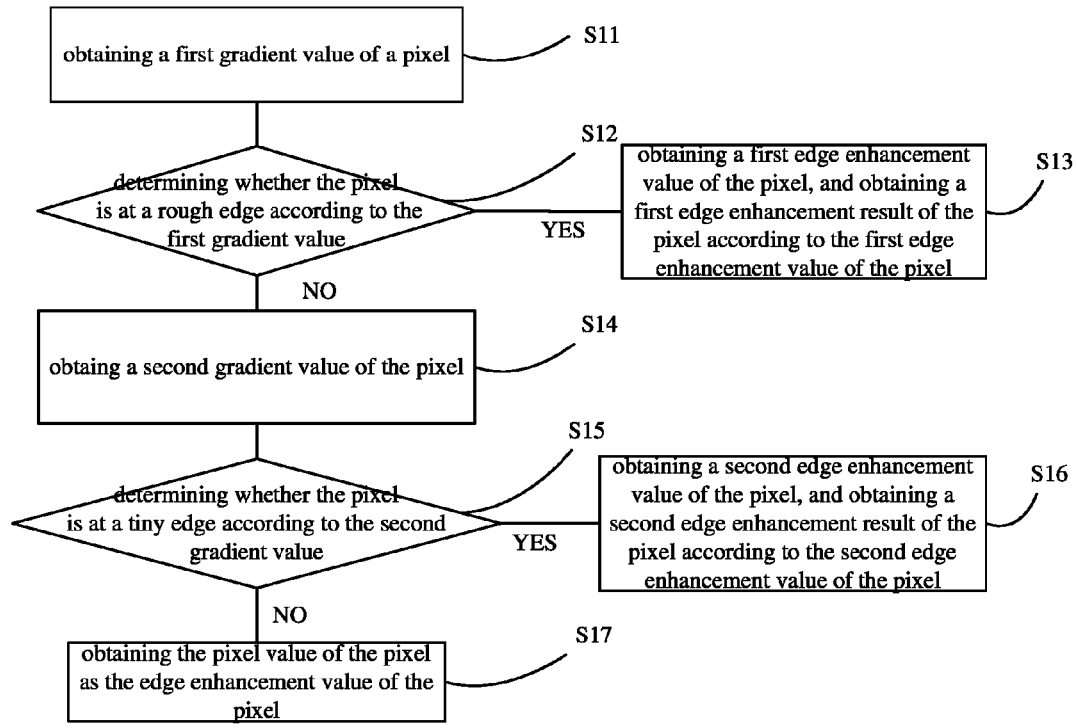
FIG. 1 is a flow chart showing a method for enhancing an edge of an image according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity, and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may include an embodiment in which an additional feature is formed between the first feature and the second feature so that the first feature does not directly contact the second feature.

Terms concerning attachments, coupling and the like, such as "connected", refer to a relationship in which structures are secured or attached to one another either directly or indirectly through intervening structures, as well as both movable or rigid attachments or relationships, unless expressly described otherwise. Unless specified or limited otherwise, the terms "connected" and variations thereof are used broadly and encompass both direct and indirect mountings, connections, supports, and couplings. Further, "connected" are not restricted to physical or mechanical connections.

The embodiments of the present disclosure will be described in detail hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

It is found that, in conventional methods for enhancing an edge of an image (such as, Sobel algorithm), edge extraction is not fine enough, which results in that some details are lost, thus reducing the resolution of the image. Therefore, in the present disclosure, a tiny edge of the image is detected effectively, improving the resolution of the image.

FIG. 1 is a flow chart showing a method for enhancing an edge of an image according to a first embodiment of the present disclosure. Referring to FIG. 1, the method for enhancing an edge of an image according to the first embodiment of the present disclosure includes following steps.

At step S11, a first gradient value of a pixel of the image is obtained.

At step S12, it is determined whether the pixel is at a rough edge according to the first gradient value of the pixel. If yes, executing step S13, and if no, executing step S14.

At step S13, a first edge enhancement value of the pixel is obtained, and a first edge enhancement result of the pixel is obtained according to the first edge enhancement value of the pixel.

At step S14, a second gradient value of the pixel is obtained.

At step S15, it is determined whether the pixel is at a tiny edge according to the second gradient value of the pixel. If yes, executing step S16, and if no, executing step S17.

At step S16, a second edge enhancement value of the pixel is obtained, and a second edge enhancement result of the pixel is obtained according to the second edge enhancement value of the pixel.

At step S17, the pixel value of the pixel is obtained as the edge enhancement result of the pixel.

Above steps are repeated until each pixel of the image is processed, thus achieving an edge enhancement for the image.

In one embodiment of the present disclosure, Sobel algorithm is used to detect the rough edge of the image. Generally, a first matrix is firstly established by taking the pixel of the image as a center. FIG. 3 is a schematic diagram showing a first matrix established by taking a pixel P(i,j) as a center according to an embodiment of the present disclosure. Referring to FIG. 3, the first matrix is a 5×5 matrix. Subsequently, the first gradient value of the pixel is calculated according to the first matrix.

The first gradient value of the pixel may include a first horizontal gradient value, a first longitudinal gradient value, a gradient value in 45-degree direction, and a gradient value in 135-degree direction. Since edges in other directions are not typical and more complicated to detect, only above four directions are detected in one embodiment of the present disclosure. It should be understood that, in other embodiments of the present disclosure, other directions can also be detected. Specifically, taking the pixel P(i,j) as an example, in which 'i' is a row value and 'j' is a column value, the first horizontal gradient value, the first longitudinal gradient value, the gradient value in the 45-degree direction, and the gradient value in the 135-degree direction of the pixel P(i,j) can be calculated as follows.

The first horizontal gradient value H is determined according to:

$$H=|(2 \times A(i,j)+A(i,j-1)+A(i,j+1))-(2 \times A(i-2,j)+A(i-2,j-1)+A(i-2,j+1))|+|(2 \times A(i,j)+A(i,j-1)+A(i,j+1))-(2 \times A(i+2,j)+A(i+2,j-1)+A(i+2,j+1))|;$$

the first longitudinal gradient value V is determined according to:

$$V=|(2 \times A(i,j)+A(i-1,j)+A(i+1,j))-(2 \times A(i,j-2)+A(i-1,j-2)+A(i+1,j-2))|+|(2 \times A(i,j)+A(i-1,j)+A(i+1,j))-(2 \times A(i,j+2)+A(i-1,j+2)+A(i+1,j+2))|;$$

the gradient value X in the 45-degree direction is determined according to:

$$X=|(2 \times A(i,j)+A(i-1,j+1)+A(i+1,j-1))-(2 \times A(i-1,j-1)+A(i-2,j)+A(i,j-2))|+|(2 \times A(i,j)+A(i-1,j+1)+A(i+1,j-1))-(2 \times A(i+1,j+1)+A(i,j+2)+A(i+2,j))|;$$

the gradient value Y in the 135-degree direction is determined according to:

$$Y=|(2 \times A(i,j)+A(i-1,j-1)+A(i+1,j+1))-(2 \times A(i-1,j+1)+A(i-2,j)+A(i,j+2))|+|(2 \times A(i,j)+A(i-1,j-1)+A(i+1,j+1))-(2 \times A(i+1,j-1)+A(i,j-2)+A(i+2,j))|;$$

where A(i,j) is the pixel value of the pixel P(i,j), A(i−1,j), A(i−2,j), A(i−1,j−1), A(i−2,j−1), A(i−1,j+1), A(i−1,j+2), A(i−2,j+1), A(i,j−1), A(i,j−2), A(i,j+1), A(i,j+2), A(i+1,j), A(i+1,j−1), A(i+1,j−2), A(i+1,j+1), A(i+1,j+2), A(i+2,j), A(i+2,j−1), A(i+2,j+1) and A(i−1,j−2) are pixel values of other pixels in the first matrix.

Specifically, whether the pixel is at the rough edge may be determined according to the first horizontal gradient value, the first longitudinal gradient value, the gradient value in the 45-degree direction, and the gradient value in the 135-degree direction of the pixel, a first predetermined rough threshold and a second preset rough threshold. In one embodiment of the present disclosure, whether the pixel is at a horizontally rough edge or at a longitudinally rough edge is determined firstly, and then whether the pixel is at a rough edge in the 45-degree direction or at a rough edge in the 135-degree direction is determined. Taking the pixel P(i,j) as an example, whether the pixel is at the rough edge is determined as follows.

If the first horizontal gradient value H is larger than a sum of the first longitudinal gradient value V and the first predetermined rough threshold TH1, and larger than the second predetermined rough threshold TH2, i.e., H>V+TH1 and H>TH2, the pixel P(i,j) is determined as being at the horizontally rough edge.

If the first longitudinal gradient value V is larger than a sum of the first horizontal gradient value H and the first predetermined rough threshold TH1, and larger than the second predetermined rough threshold TH2, i.e., V>H+TH1 and V>TH2, the pixel P(i,j) is determined as being at the longitudinally rough edge.

If the gradient value X in the 45-degree direction is larger than a sum of the gradient value Y in the 135-degree direction and the first predetermined rough threshold TH1, and larger than the second predetermined rough threshold TH2, i.e., X>Y+TH1 and X>TH2, the pixel P(i,j) is determined as being at the rough edge in the 45-degree direction.

If the gradient value Y in the 135-degree direction is larger than a sum of the gradient value X in the 45-degree direction and the first predetermined rough threshold TH1, and larger than the second predetermined rough threshold TH2, i.e., Y>X+TH1 and Y>TH2, the pixel P(i,j) is determined as being at the rough edge in the 135-degree direction.

It should be noted that, the first predetermined rough threshold TH1 and the second predetermined rough threshold TH2 are empirical values. In particular, the first predetermined rough threshold TH1 ranges from 15 to 32, and the second predetermined rough threshold TH2 ranges from 24 to 48.

In one embodiment of the present disclosure, Sobel algorithm is used to detect the tiny edge of the image. Generally, a second matrix is firstly established by taking the pixel of the image as a center. A number of pixels in the first matrix is larger than that in the second matrix. FIG. 4 is a schematic diagram showing a second matrix established by taking the pixel P(i,j) as a center according to an embodiment of the present disclosure. Referring to FIG. 4, the second matrix is a 3×3 matrix. Subsequently, the second gradient value of the pixel is calculated according to the second matrix. The second gradient value of the pixel may include a second horizontal gradient value and a second longitudinal gradient value. For the tiny edge, edges in the 45-degree direction and 135-degree direction are not obvious. Thus, in this embodiment, only gradient values in the horizontal direction and the longitudinal direction are calculated. It should be understood that, in other embodiments of the present disclosure, gradient values in other directions can also be calculated. Specifically, taking the pixel P(i,j) as an example, the second horizontal gradient value and the second longitudinal gradient value of the pixel are determined as follows.

The second horizontal gradient value H1 is determined according to:

$$H1=|(2 \times A(i,j)+A(i,j-1)+A(i,j+1))-(2 \times A(i-1,j)+A(i-1,j-1)+A(i-1,j+1))|+|(2 \times A(i,j)+A(i,j-1)+A(i,j+1))-(2 \times A(i+1,j)+A(i+1,j-1)+A(i+1,j+1))|;$$

the second longitudinal gradient value V1 is determined according to:

$$V1=|(2 \times A(i,j)+A(i-1,j)+A(i+1,j))-(2 \times A(i,j-1)+A(i-1,j-1)+A(i+1,j-1))|+|(2 \times A(i,j)+A(i-1,j)+A(i+1,j))-(2 \times A(i,j+1)+A(i-1,j+1)+A(i+1,j+1));$$

where A(i,j) is the pixel value of the pixel P(i,j), A(i−1,j), A(i−1,j−1), A(i−1,j+1), A(i,j−1), A(i,j−2), A(i,j+1), A(i+1,j), A(i+1, j−1) and A(i+1,j+1) are the pixel values of other pixels in the second matrix.

Specifically, whether the pixel is at the tiny edge is determined according to the second horizontal gradient value and the second longitudinal gradient value of the pixel, and a first predetermined tiny threshold and a second predetermined tiny threshold. In one embodiment of the present disclosure, whether the pixel is at the tiny edge is determined as follows.

If the second horizontal gradient value H1 is larger than a sum of the second longitudinal gradient value V1 and the first predetermined tiny threshold TH3, and larger than the second predetermined tiny threshold TH4, i.e., H1>V1+TH3 and H1>TH4, the pixel P(i,j) is determined at the horizontally tiny edge.

If the second longitudinal gradient value V1 is larger than a sum of the second horizontal gradient value H1 and the first predetermined tiny threshold TH3, and larger than the second predetermined tiny threshold TH4, i.e., V1>H1+TH3 and V1>TH4, the pixel P(i,j) is determined at the longitudinally tiny edge.

It should be understood that, a longest distance between pixels in the first matrix is relatively larger, so the edge detection is rough; however, a longest distance between pixels in the second matrix is relatively small, so the edge detection is tiny. In addition, in one embodiment of the present disclosure, the rough edge detection is firstly performed, and then the tiny edge detection is performed. When the rough edge detection is performed, whether the pixel is at the horizontally rough edge or at the longitudinally rough edge is determined firstly, and then whether the pixel is at the rough edge in the 45-degree direction or at the rough edge in the 135-degree direction is determined.

In one embodiment of the present disclosure, the first edge enhancement values are calculated in directions corresponding to the directions in which the rough edge detection is performed, and the second edge enhancement values are calculated in directions corresponding to the directions in which the tiny edge detection is performed. In other words, if the first gradient value in the horizontal direction, the longitudinal direction, the 45-degree direction and the 145-degree direction are calculated when the rough edge detection is performed, the first edge enhancement value in the horizontal direction, the longitudinal direction, the 45-degree direction and the 145-degree direction are calculated. If the second gradient value in the horizontal direction and the longitudinal direction are calculated when the tiny edge detection is performed, the second edge enhancement value in the horizontal direction and the longitudinal direction are calculated.

Taking the pixel $P(i,j)$ as an example, the first and second edge enhancement values of the pixel $P(i,j)$ are calculated as follows.

The first edge enhancement value Enhance_H of the pixel $P(i,j)$ at the horizontally rough edge is determined according to:

$$\text{Enhance\_}H = 2\times(2\times A(i,j) + A(i,j-1) + A(i,j+1)) - (2\times A(i-2,j) + A(i-2,j-1) + A(i-2,j+1)) - (2\times A(i+2,j) + A(i+2,j-1) + A(i+2,j+1)) + A(i,j) - 1/8\times(A(i-1,j-1) + A(i+1,j-1) + A(i-1,j+1) + A(i+1,j+1) + A(i-1,j) + A(i+1,j) + A(i,j-1) + A(i,j+1)).$$

The first edge enhancement value Enhance_V of the pixel $P(i,j)$ at the longitudinally rough edge is determined according to:

$$\text{Enhance\_}V = 2\times(2\times A(i,j) + A(i-1,j) + A(i+1,j)) - (2\times A(i,j-2) + A(i-1,j-2) + A(i+1,j-2)) - (2\times A(i,j+2) + A(i-1,j+2) + A(i+1,j+2)) + A(i,j) - 1/8\times(A(i-1,j-1) + A(i+1,j-1) + A(i-1,j+1) + A(i+1,j+1) + A(i-1,j) + A(i+1,j) + A(i,j-1) + A(i,j+1)).$$

The first edge enhancement value Enhance_X of the pixel $P(i,j)$ at the rough edge in the 45-degree direction is determined according to:

$$\text{Enhance\_}X = 2\times(2\times A(i,j) + A(i-1,j+1) + A(i+1,j-1)) - (2\times A(i-1,j-1) + A(i-2,j) + A(i,j-2)) - (2\times A(i+1,j+1) + A(i,j+2) + A(i+2,j)).$$

The first edge enhancement value Enhance_Y of the pixel $P(i,j)$ at the rough edge in the 135-degree direction is determined according to:

$$\text{Enhance\_}Y = 2\times(2\times A(i,j) + A(i-1,j-1) + A(i+1,j+1)) - (2\times A(i-1,j+1) + A(i-2,j) + A(i,j+2)) - (2\times A(i+1,j-1) + A(i,j-2) + A(i+2,j)).$$

The second edge enhancement value of the pixel $P(i,j)$ at the horizontally tiny edge is determined according to:

$$\text{Enhance\_}H1 = 2\times(2\times A(i,j) + A(i,j-1) + A(i,j+1)) - (2\times A(i-2,j) + A(i-2,j-1) + A(i-2,j+1)) - (2\times A(i+2,j) + A(i+2,j-1) + A(i+2,j+1)) + A(i,j) - 1/8\times(A(i-1,j-1) + A(i+1,j-1) + A(i-1,j+1) + A(i+1,j+1) + A(i-1,j) + A(i+1,j) + A(i,j-1) + A(i,j+1)).$$

The second edge enhancement value of the pixel $P(i,j)$ at the longitudinally tiny edge is determined according to:

$$\text{Enhance\_}V1 = 2\times(2\times A(i,j) + A(i-1,j) + A(i+1,j)) - (2\times A(i,j-2) + A(i-1,j-2) + A(i+1,j-2)) - (2\times A(i,j+2) + A(i-1,j+2) + A(i+1,j+2)) + A(i,j) - 1/8\times(A(i-1,j-1) + A(i+1,j-1) + A(i-1,j+1) + A(i+1,j+1) + A(i-1,j) + A(i+1,j) + A(i,j-1) + A(i,j+1)).$$

It should be noted that the first edge enhancement values Enhance_H, Enhance_V, Enhance_X and Enhance_Y may be positive or negative. If the first edge enhancement value is positive, the pixel $P(i,j)$ is at a bright edge, and a value should be added to the original pixel value $A(i,j)$ of the pixel $P(i,j)$, thus making the bright edge more brighter. If the first edge enhancement value is negative, then the pixel $P(i,j)$ is at a dark edge, and a value should be subtracted from the original pixel value $A(i,j)$ of the pixel $P(i,j)$, thus making the dark edge more darker. Thus, an edge sharpening of the image is realized, and the resolution of the image is improved.

Likewise, the second edge enhancement values Enhance_H1 and Enhance_V1 may also be positive or negative. If the second edge enhancement value is positive, the pixel $P(i,j)$ is at the bright edge, and a value should be added to the original pixel value $A(i,j)$ of the pixel $P(i,j)$, thus making the bright edge more brighter. If the second edge enhancement value is negative, the pixel $P(i,j)$ is at the dark edge, and a value should be subtracted from the original pixel value $A(i,j)$ of the pixel $P(i,j)$, thus making the dark edge more darker. Thus, the edge sharpening of the image is realized, and the resolution of the image is improved.

Taking the pixel $P(i,j)$ as an example, in one embodiment of the present disclosure, the edge enhancement result of the pixel $P(i,j)$ is determined as follows.

If the pixel is at the horizontally rough edge, the edge enhancement result $A(i,j)\_OUT$ is determined according to:

$$A(i,j)\_OUT = A(i,j) + K\times\text{Enhance\_}H.$$

If the pixel is at the longitudinally rough edge, the edge enhancement result $A(i,j)\_OUT$ is determined according to:

$$A(i,j)\_OUT = A(i,j) + K\times\text{Enhance\_}V.$$

If the pixel is at the rough edge in the 45-degree direction, the edge enhancement result $A(i,j)\_OUT$ is determined according to:

$$A(i,j)\_OUT = A(i,j) + K\times\text{Enhance\_}X.$$

If the pixel is at the rough edge in the 135-degree direction, the edge enhancement result $A(i,j)\_OUT$ is determined according to:

$$A(i,j)\_OUT = A(i,j) + K\times\text{Enhance\_}Y.$$

If the pixel is at the horizontally tiny edge, the edge enhancement result $A(i,j)\_OUT$ is determined according to:

$$A(i,j)\_OUT = A(i,j) + K\times\text{Enhance\_}H1.$$

If the pixel is at the longitudinally tiny edge, the edge enhancement result $A(i,j)\_OUT$ is determined according to:

$$A(i,j)\_OUT = A(i,j) + K\times\text{Enhance\_}V1.$$

K is a predetermined enhancement coefficient. By adjusting the predetermined enhancement coefficient K, a degree of the edge enhancement can be adjusted. The predetermined enhancement coefficient K generally ranges from 0.25 to 2.

If the pixel is neither at the rough edge nor at the tiny edge, the pixel is in a flat area of the image and is not needed to be enhanced. Thus, the pixel value of the pixel can be determined as the edge enhancement result, i.e., $A(i,j)\_OUT = A(i,j)$.

With the method for enhancing an edge of an image according to embodiments of the present disclosure, by performing not only the rough edge detection but also the tiny edge detection, and by obtaining the edge enhancement result according to the result of the rough edge detection and the tiny edge detection, detail information of the image can be increased and, thus, the resolution of the image is improved.

Figure 2:
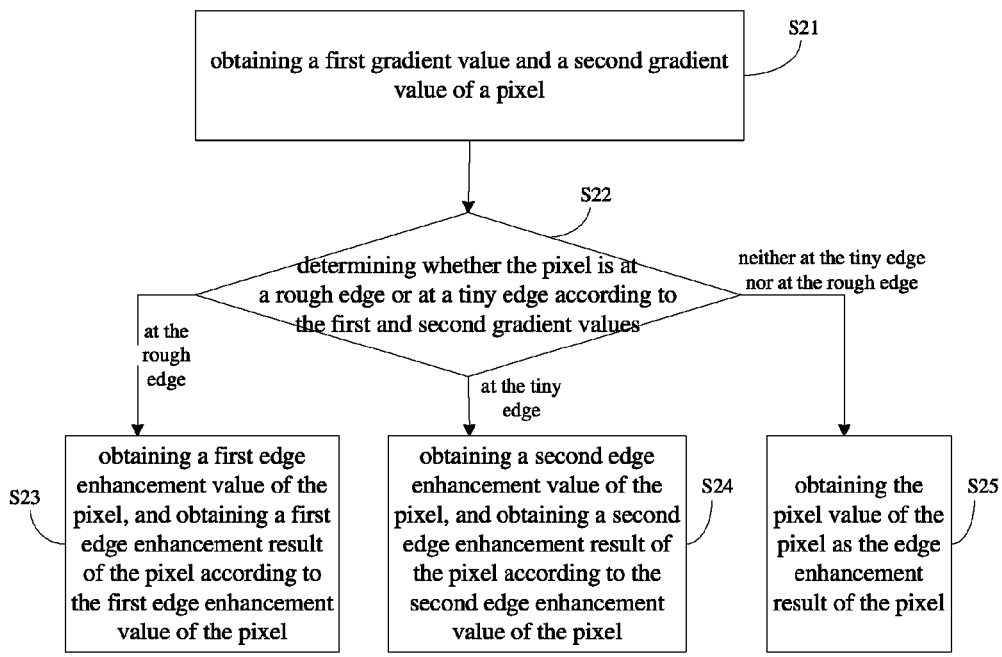
FIG. 2 is a flow chart showing a method for enhancing an edge of an image according to a second embodiment of the present disclosure.

FIG. 2 is a flow chart showing a method for enhancing an edge of an image according to a second embodiment of the present disclosure. Referring to FIG. 2, the method for enhancing an edge of an image includes following steps.

At step S21, a first gradient value and a second gradient value of a pixel of the image are obtained simultaneously.

At step S22, it is determined whether the pixel is at a rough edge or at a tiny edge according to the first gradient value and the second gradient value of the pixel.

At step S23, if the pixel is at the rough edge, a first edge enhancement value of pixel is obtained, and a first edge enhancement result of the pixel is obtained according to the first edge enhancement value of the pixel.

At step S24, if the pixel is at the tiny edge, a second edge enhancement value of the pixel is obtained, and a second edge enhancement result of the pixel is obtained according to the second edge enhancement value of the pixel.

At step S25, if the pixel is neither at the tiny edge nor at the rough edge, the pixel value of the pixel is obtained as the edge enhancement result of the pixel.

The above steps S21-S25 are repeated until each pixel of the image is processed, thus obtaining an edge enhancement of the image.

The difference between the second embodiment and the first embodiment includes that the second gradient value of the pixel of the image is obtained before determining whether the pixel is at the rough edge, i.e., the tiny edge detection and the rough edge detection are performed simultaneously. Further, the first edge enhancement value and the second edge enhancement value of the pixel can be obtained simultaneously. Moreover, the first edge enhancement value and the second edge enhancement value of the pixel can be obtained simultaneously with the first gradient value and the second gradient value.

With the method for enhancing an edge of an image according to embodiments of the present disclosure, by performing not only the tough edge detection but also the tiny edge detection, and by obtaining the edge enhancement result of the pixel according to the result of the rough edge detection and the tiny edge detection, the detail information of the image can be increased, and thus the resolution of the image is improved.

Figure 5:
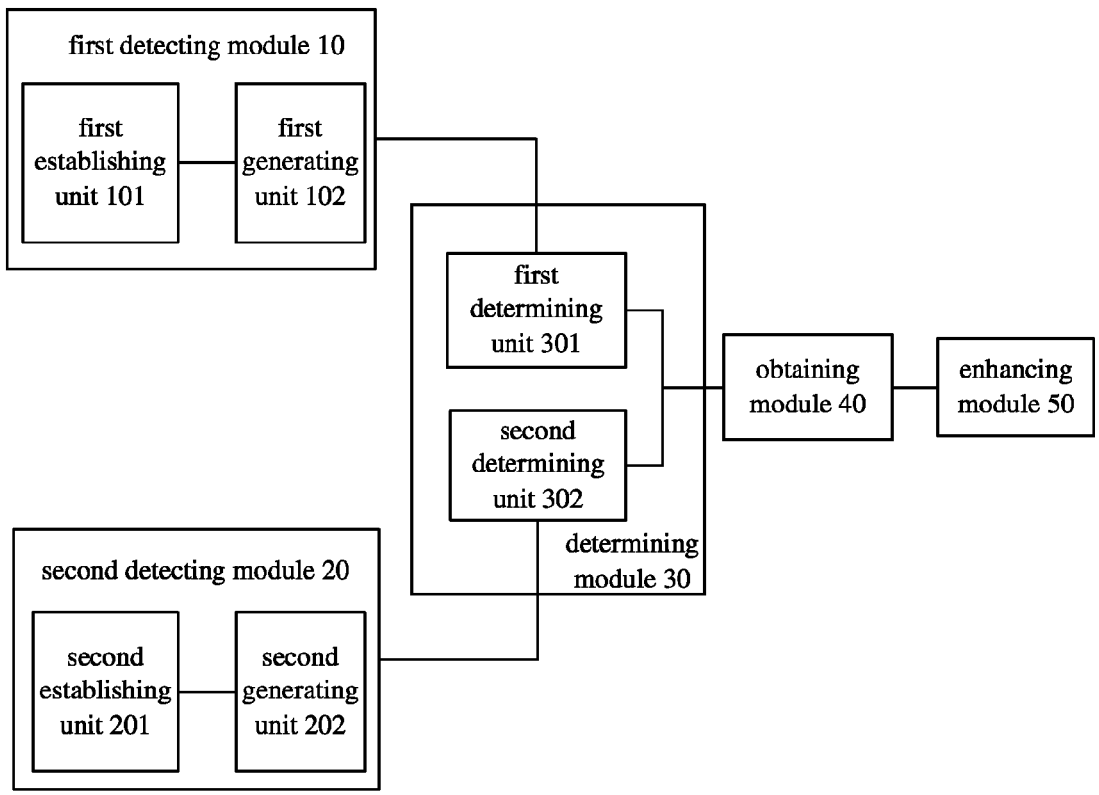
FIG. 5 is a schematic diagram showing a device for enhancing an edge of an image according to an embodiment of the present disclosure.

FIG. 5 is a schematic diagram showing a device for enhancing an edge of an image according to an embodiment of the present disclosure. Referring to FIG. 5, the device includes a first detecting module 10, a second detecting module 20, a determining module 30, an obtaining module 40 and an enhancing module 50.

The first detecting module 10 is configured to obtain a first gradient value of a pixel of the image. The second detecting module 20 is configured to obtain a second gradient value of the pixel. The determining module 30 is connected with the first detecting module 10 and the second detecting module 20, respectively, and is configured to determine whether the pixel is at a rough edge according to the first gradient value of the pixel and to determine whether the pixel is at a tiny edge according to the second gradient value of the pixel. The obtaining module 40 is connected with the determining module, and is configured to obtain an edge enhancement value of the pixel according to a determining result of the determining module. The enhancing module 50 is connected with the obtaining module 40, and is configured to obtain an edge enhancement result of the pixel according to the edge enhancement value of the pixel.

In one embodiment of the present disclosure, referring to FIG. 5, the first detecting module 10 may include a first establishing unit 101 and a first generating unit 102. The first establishing unit 101 is configured to establish a first matrix by taking the pixel of the image as a center. The first matrix may be a 5×5 matrix. The first generating unit 102 is connected with the first establishing unit 101, and is configured to generate a first horizontal gradient value, a first longitudinal gradient value, a gradient value in a 45-degree direction and a gradient value in a 135-degree direction according to the first matrix established by the first generating unit 101.

Specifically, taking a pixel P(i,j) as an example, in which 'i' is a row value and 'j' is a column value, the first generating unit 102 determines the first horizontal gradient value, the first longitudinal gradient value, the gradient value in the 45-degree direction and the gradient value in the 135-degree direction respectively as follows.

The first horizontal gradient value H is determined according to:

$$H=|(2{\times}A(i,j)+A(i,j-1)+A(i,j+1))-(2{\times}A(i-2,j)+A(i-2,j-1)+A(i-2,j+1))|+|(2{\times}A(i,j)+A(i,j-1)+A(i,j+1))-(2{\times}A(i+2,j)+A(i+2,j-1)+A(i+2,j+1))|;$$

the first longitudinal gradient value V is determined according to:

$$V=|(2{\times}A(i,j)+A(i-1,j)+A(i+1,j))-(2{\times}A(i,j-2)+A(i-1,j-2)+A(i+1,j-2))|+|(2{\times}A(i,j)+A(i-1,j)+A(i+1,j))-(2{\times}A(i,j+2)+A(i-1,j+2)+A(i+1,j+2))|;$$

the gradient value X in the 45-degree direction is determined according to:

$$X=|(2{\times}A(i,j)+A(i-1,j+1)+A(i+1,j-1))-(2{\times}A(i-1,j-1)+A(i-2,j)+A(i,j-2))|+|(2{\times}A(i,j)+A(i-1,j+1)+A(i+1,j-1))-(2{\times}A(i+1,j+1)+A(i,j+2)+A(i+2,j))|;$$

the gradient value Y in the 135-degree direction is determined according to:

$$Y=|(2{\times}A(i,j)+A(i-1,j-1)+A(i+1,j+1))-(2{\times}A(i-1,j+1)+A(i-2,j)+A(i,j+2))|+|(2{\times}A(i,j)+A(i-1,j-1)+A(i+1,j+1))-(2{\times}A(i+1,j-1)+A(i,j-2)+A(i+2,j))|;$$

where A(i,j) is the pixel value of the pixel P(i,j), A(i−1,j), A(i−2,j), A(i−1,j−1), A(i−2,j−1), A(i−1,j+1), A(i−1,j+2), A(i−2,j+1), A(i,j−1), A(i,j−2), A(i,j+1), A(i,j+2), A(i+1,j), A(i+1,j−1), A(i+1,j−2), A(i+1,j+1), A(i+1,j+2), A(i+2,j), A(i+2,j−1), A(i+2,j+1) and A(i−1,j−2) are the pixel values of other pixels in the first matrix.

In one embodiment of the present disclosure, the second detecting module 20 may include a second establishing unit 201 and a second generating unit 202. The second establishing unit 201 is configured to establish a second matrix by taking the pixel of the image as a center. A number of pixels in the first matrix is larger than that in the first matrix. The second matrix may be a 3×3 matrix. A longest distance between pixels in the first matrix is relatively larger, so the edge detection is rough, however, a longest distance between pixels in the second matrix is relatively smaller, so the edge detection is tiny.

The second generating unit 202 is connected with the second establishing unit 201, and is configured to generate a second horizontal gradient value and a second longitudinal gradient value of the pixel according to the second matrix established by the second generating unit 201. Specifically, taking the pixel P(i,j) as an example, the second generating unit 202 determines the second horizontal gradient value and the second longitudinal gradient value respectively as follows.

The second horizontal gradient value H1 is determined according to:

$$H1=|(2\times A(i,j)+A(i,j-1)+A(i,j+1))-(2\times A(i-1,j)+A(i-1,j-1)+A(i-1,j+1))|+|(2\times A(i,j)+A(i,j-1)+A(i,j+1))-(2\times A(i+1,j)+A(i+1,j-1)+A(i+1,j+1))|;$$

the second longitudinal gradient value V1 is determined according to:

$$V1=|(2\times A(i,j)+A(i-1,j)+A(i+1,j))-(2\times A(i,j-1)+A(i-1,j-1)+A(i+1,j-1))|+|(2\times A(i,j)+A(i-1,j)+A(i+1,j))-(2\times A(i,j+1)+A(i-1,j+1)+A(i+1,j+1));$$

where A(i,j) is the pixel value of the pixel P(i,j), A(i−1,j), A(i−1,j−1), A(i−1,j+1), A(i,j−1), A(i,j−2), A(i,j+1), A(i+1,j), A(i+1,j−1) and A(i+1,j+1) are the pixel values of other pixels in the second matrix.

In one embodiment, as shown in FIG. 5, the determining module 300 may include a first determining unit 301 and a second determining unit 302.

The first determining unit 301 is configured to determine whether the pixel is at the rough edge according to the first horizontal gradient value, the first longitudinal gradient value, the gradient value in the 45-degree direction the gradient value in the 135-degree direction, a first predetermined rough threshold and a second predetermined rough threshold. Specifically, taking the pixel P(i,j) as an example, if the first horizontal gradient value H is larger than a sum of the first longitudinal gradient value V and the first predetermined rough threshold TH1, and larger than the second predetermined rough threshold TH2, i.e., H>V+TH1 and H>TH2, the first determining unit 301 determines that the pixel is at a horizontally rough edge; if the first longitudinal gradient value V is larger than a sum of the first horizontal gradient value H and the first predetermined rough threshold TH1, and larger than the second predetermined rough threshold TH2, i.e., V>H+TH1 and V>TH2, the first determining unit 301 determines that the pixel is at a longitudinally rough edge; if the gradient value X in the 45-degree direction is larger than a sum of the gradient value Y in the 135-degree direction and the first predetermined rough threshold TH1, and larger than the second predetermined rough threshold TH2, i.e., X>Y+TH1 and X>TH2, the first determining unit 301 determines that the pixel is at a rough edge in the 45-degree direction; if the gradient value Y in the 135-degree direction is larger than a sum of the gradient value X in the 45-degree direction and the first predetermined rough threshold TH1, and larger than the second predetermined rough threshold TH2, the first determining unit 301 determines that the pixel is at a rough edge in the 135-degree direction.

The second determining unit 302 is configured to determine whether the pixel is at the tiny edge according to the second horizontal gradient value and the second longitudinal gradient value of the pixel, and a first predetermined tiny threshold and a second predetermined tiny threshold. Specifically, taking the pixel P(i,j) as an example, if the second horizontal gradient value H1 is larger than a sum of the second longitudinal gradient value V1 and the first predetermined tiny threshold TH3, and larger than the second predetermined tiny threshold TH4, i.e., H1>V1+TH3 and H1>TH4, the second determining unit 302 determines that the pixel is at a horizontally tiny edge; if the second longitudinal gradient value V1 is larger than a sum of the second horizontal gradient value H1 and the first predetermined tiny threshold TH3, and larger than the second predetermined tiny threshold TH4, i.e., V1>H1+TH3 and V1>TH4, the second determining unit 302 determines that the pixel is at a longitudinally tiny edge.

In one embodiment of the present disclosure, the obtaining module 40 obtains the edge enhancement value in directions corresponding to the directions in which rough edge detection and tiny edge detection are performed. In other words, if the first gradient value in the horizontal direction, the longitudinal direction, the 45-degree direction and the 145-degree direction is calculated, the edge enhancement value in the horizontal direction, the longitudinal direction, the 45-degree direction and the 145-degree direction is calculated for the pixel at the rough edge. Furthermore, only the edge enhancement value in the horizontal direction and the longitudinal direction is calculated for the pixel at the tiny edge, this is because the edges in the 45-degree direction and the 135-degree direction are not obvious.

Taking the pixel P(i,j) as an example, the edge enhancement value for the pixel at the tiny edge is determined as follows.

The edge enhancement value Enhance_H1 for the pixel P(i,j) at the horizontally tiny edge is determined according to:

$$\text{Enhance\_}H1=2\times(2\times A(i,j)+A(i,j-1)+A(i,j+1))-(2\times A(i-2,j)+A(i-2,j-1)+A(i-2,j+1)-(2\times A(i+2,j)+A(i+2,j-1)+A(i+2,j+1))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1)).$$

The edge enhancement value Enhance_V1 for the pixel P(i,j) at the longitudinally tiny edge is determined according to:

$$\text{Enhance\_}V1=2\times(2\times A(i,j)+A(i-1,j)+A(i+1,j))-(2\times A(i,j-2)+A(i-1,j-2)+A(i+1,j-2)-(2\times A(i,j+2)+A(i-1,j+2)+A(i+1,j+2))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1)).$$

In one embodiment of the present disclosure, the edge enhancement value for the pixel P(i,j) at the rough edge is determined as follows.

The edge enhancement value Enhance_H for the pixel P(i,j) at the horizontally rough edge is determined according to:

$$\text{Enhance\_}H=2\times(2\times A(i,j)+A(i,j-1)+A(i,j+1))-(2\times A(i-2,j)+A(i-2,j-1)+A(i-2,j+1))-(2\times A(i+2,j)+A(i+2,j-1)+A(i+2,j+1))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1)).$$

The edge enhancement value Enhance_V of the pixel P(i,j) at the longitudinally rough edge is determined according to:

$$\text{Enhance\_}V=2\times(2\times A(i,j)+A(i-1,j)+A(i+1,j))-(2\times A(i,j-2)+A(i-1,j-2)+A(i+1,j-2)-(2\times A(i,j+2)+A(i-1,j+2)+A(i+1,j+2))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1)).$$

The edge enhancement value Enhance_X of the pixel P(i,j) at the rough edge in the 45-degree direction is determined according to:

$$\text{Enhance\_}X=2\times(2\times A(i,j)+A(i-1,j+1)+A(i+1,j-1))-(2\times A(i-1,j-1)+A(i-2,j)+A(i,j-2))-(2\times A(i+1,j+1)+A(i,j+2)+A(i+2,j)).$$

The edge enhancement value Enhance_Y of the pixel P(i,j) at the rough edge in the 135-degree direction is determined according to:

$$\text{Enhance\_}Y=2\times(2\times A(i,j)+A(i-1,j-1)+A(i+1,j+1))-(2\times A(i-1,j+1)+A(i-2,j)+A(i,j+2))-(2\times A(i+1,j-1)+A(i,j-2)+A(i+2,j)).$$

In one embodiment of the present disclosure, the enhancing module 50 obtains the edge enhancement result of the pixel P(i,j) as follows.

If the pixel is at the horizontally rough edge, the edge enhancement result A(i,j)_OUT is determined according to:

$$A(i,j)\_OUT = A(i,j) + K \times Enhance\_H.$$

If the pixel is at the longitudinally rough edge, the edge enhancement result A(i,j)_OUT is determined according to:

$$A(i,j)\_OUT = A(i,j) + K \times Enhance\_V.$$

If the pixel is at the rough edge in the 45-degree direction, the edge enhancement result A(i,j)_OUT is determined according to:

$$A(i,j)\_OUT = A(i,j) + K \times Enhance\_X.$$

If the pixel is at the rough edge in the 135-degree direction, the edge enhancement result A(i,j)_OUT is determined according to:

$$A(i,j)\_OUT = A(i,j) + K \times Enhance\_Y.$$

If the pixel is at the horizontally tiny edge, the edge enhancement result A(i,j)_OUT is determined according to:

$$A(i,j)\_OUT = A(i,j) + K \times Enhance\_H1.$$

If the pixel is at the longitudinally tiny edge, the edge enhancement result A(i,j)_OUT is determined according to:

$$A(i,j)\_OUT = A(i,j) + K \times Enhance\_V1.$$

K is a predetermined enhancement coefficient. By adjusting the predetermined enhancement coefficient K, the degree of the edge enhancement can be adjusted. The predetermined enhancement coefficient K generally ranges from 0.25 to 2.

It should be noted that the first edge enhancement values Enhance_H, Enhance_V, Enhance_X and Enhance_Y may be positive or negative. If the first edge enhancement value is positive, the pixel P(i,j) is at a bright edge, and thus the bright edge is made brighter by adding a value to the original pixel value A(i,j) of the pixel P(i,j). If the first edge enhancement value is negative, the pixel P(i,j) is at a dark edge, and thus the dark edge is made darker by subtracting a value from the original pixel value A(i,j) of the pixel P(i,j). Thus, an edge sharpening of the image is realized, and the resolution of the image is improved.

Likewise, the second edge enhancement values Enhance_H1 and Enhance_V1 may also be positive or negative. If the second edge enhancement value is positive, the pixel P(i,j) is at the bright edge, and thus the bright edge is made brighter by adding a value to the original pixel value A(i,j) of the pixel P(i,j). If the second edge enhancement value is negative, the pixel P(i,j) is at the dark edge, and thus the dark edge is made darker by subtracting a value from the original pixel value A(i,j) of the pixel P(i,j). Thus, the edge sharpening of the image is realized, and the resolution of the image is improved.

With the device for enhancing an edge of an image according to embodiments of the present disclosure, by performing not only the rough edge detection but also the tiny edge detection, and by obtaining the edge enhancement result of the pixel according to the result of the rough edge detection and the tiny edge detection, the detail information of the image can be increased, and thus the resolution of the image is improved.

Figure 6:
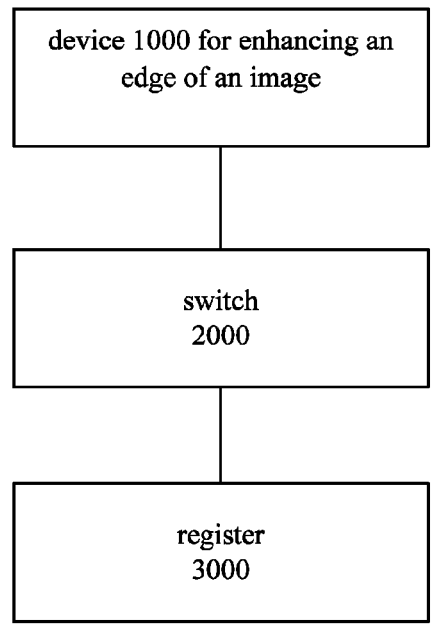
FIG. 6 is a schematic diagram showing a digital camera according to an embodiment of the present disclosure.

The present disclosure also provides a digital camera. FIG. 6 is a schematic diagram showing a digital camera according to an embodiment of the present disclosure. Referring to FIG. 6, the digital camera includes the device 1000 for enhancing an edge of an image, a switch 2000 and a register 3000. The switch 2000 is connected with the device 1000 for enhancing the edge of the image. The register 3000 is connected with the switch 2000, and is configured to control the switch 2000 to turn on or off.

With the digital camera according to embodiments of the present disclosure, by controlling the switch to turn on to connect with the device for enhancing the edge of the image if necessary and controlling the switch to turn off to bypass the device for enhancing the edge of the image if not necessary, a resolution of the image generated by the digital camera can be enhanced effectively.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that order of execution may differ from that which is depicted. For example, the order of execution of two or more boxes may be scrambled relative to the order shown. Also, two or more boxes shown in succession in the flow chart may be executed concurrently or with particular concurrence. In addition, any number of counters, state variables, warning semaphores, or messages might be added to the logical flow described herein, for purpose of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, communicate, propagate, or transport the program for the instruction execution system, apparatus, device, or the device for use by in connection with the instruction execution system, apparatus, device. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device. Further, the computer-readable medium could even be paper or another suitable medium upon which the program is printed, for example, by the paper or other medium for optical scanning, and then edit, interpretation or in other suitable way for processing when necessary to obtain the program, and then stored in a computer memory.

Although the device, system, and method of the present disclosure is embodied in software or code executed by general purpose hardware as discussed above, as an alternative the device, system, and method may also be embodied in dedicated hardware or a combination of software/ general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and consequently, are not described in detail herein. It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but not limited to read-only memories magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A method for enhancing an edge of an image, comprising:

establishing a first matrix by taking a pixel of the image as a center;

obtaining a first gradient value of the pixel of the image according to the first matrix;

determining whether the pixel is at a rough edge according to the first gradient value of the pixel;

if the pixel is at the rough edge, obtaining a first edge enhancement value of the pixel, and obtaining a first edge enhancement result of the pixel according to the first edge enhancement value of the pixel;

if the pixel is not at the rough edge, establishing a second matrix by taking the pixel of the image as the center, and obtaining a second gradient value of the pixel, wherein a number of pixels in the first matrix is larger than a number of pixels in the second matrix;

determining whether the pixel is at a tiny edge according to the second gradient value of the pixel;

if the pixel is at the tiny edge, obtaining a second edge enhancement value of the pixel, and obtaining a second edge enhancement result of the pixel according to the second edge enhancement value of the pixel;

if the pixel is not at the tiny edge, obtaining the pixel value of the pixel as the edge enhancement result of the pixel; and performing image processing on the image in order to increase a detail information of the image and improve a resolution of the image by using the first edge enhancement result, the second edge enhancement result and the edge enhancement result of the pixel.

2. The method of claim 1, wherein the first gradient value of the pixel comprises a first horizontal gradient value, a first longitudinal gradient value, a gradient value in a 45-degree direction, and a gradient value in a 135-degree direction; and the second gradient value of the pixel comprises a second horizontal gradient value and a second longitudinal gradient value.

3. The method of claim 2, wherein obtaining the first gradient value of the pixel of the image comprises:

generating the first horizontal gradient value, the first longitudinal gradient value, the gradient value in the 45-degree direction and the gradient value in the 135-degree direction respectively according to the first matrix.

4. The method of claim 3, wherein the first matrix is a 5×5 matrix;

the first horizontal gradient value H is determined according to:

$$H=|(2\times A(i,j)+A(i,j-1)+A(i,j+1))-(2\times A(i-2,j)+A(i-2,j-1)+A(i-2,j+1))|+|(2\times A(i,j)+A(i,j-1)+A(i,j+1))-(2\times A(i+2,j)+A(i+2,j-1)+A(i+2,j+1))|;$$

the first longitudinal gradient value V is determined according to:

$$V=|(2\times A(i,j)+A(i-1,j)+A(i+1,j))-(2\times A(i,j-2)+A(i-1,j-2)+A(i+1,j-2))|+|(2\times A(i,j)+A(i-1,j)+A(i+1,j))-(2\times A(i,j+2)+A(i-1,j+2)+A(i+1,j+2))|;$$

the gradient value X in the 45-degree direction is determined according to:

$$X=|(2\times A(i,j)+A(i-1,j+1)+A(i+1,j-1))-(2\times A(i-1,j-1)+A(i-2,j)+A(i,j-2))|+|(2\times A(i,j)+A(i-1,j+1)+A(i+1,j-1))-(2\times A(i+1,j+1)+A(i,j+2)+A(i+2,j))|;\text{ and}$$

the gradient value Y in the 135-degree direction is determined according to:

$$Y=|(2\times A(i,j)+A(i-1,j-1)+A(i+1,j+1))-(2\times A(i-1,j+1)+A(i-2,j)+A(i,j+2))|+|(2\times A(i,j)+A(i-1,j-1)+A(i+1,j+1))-(2\times A(i+1,j-1)+A(i,j-2)+A(i+2,j))|;$$

where A(i,j) is the pixel value of the pixel, A(i−1,j), A(i−2,j), A(i−1,j−1), A(i−2,j−1), A(i−1,j+1), A(i−1,j+2), A(i−2,j+1), A(i,j−1), A(i,j−2), A(i,j+1), A(i,j+2), A(i+1,j), A(i+1,j−1), A(i+1,j−2), A(i+1,j+1), A(i+1,j+2), A(i+2,j), A(i+2,j−1), A(i+2,j+1) and A(i−1,j−2) are the pixel values of other pixels in the first matrix.

5. The method of claim 2, wherein determining whether the pixel is at the rough edge according to the first gradient value of the pixel comprises:
 if the first horizontal gradient value is larger than a sum of the first longitudinal gradient value and a first predetermined rough threshold, and larger than a second predetermined rough threshold, the pixel is determined at a horizontally rough edge;
 if the first longitudinal gradient value is larger than a sum of the first horizontal gradient value and the first predetermined rough threshold, and larger than the second predetermined rough threshold, the pixel is determined at a longitudinally rough edge;
 if the gradient value in the 45-degree direction is larger than a sum of the gradient value in the 135-degree direction and the first predetermined rough threshold, and larger than the second predetermined rough threshold, the pixel is determined at a rough edge in the 45-degree direction; and
 if the gradient value in the 135-degree direction is larger than a sum of the gradient value in the 45-degree direction and the first predetermined rough threshold, and larger than the second predetermined rough threshold, the pixel is determined at a rough edge in the 135-degree direction.

6. The method of claim 5, wherein
the first edge enhancement value Enhance_H of the horizontally rough edge is determined according to:

$$\text{Enhance\_H}=2\times(2\times A(i,j)+A(i,j-1)+A(i,j+1))-(2\times A(i-2,j)+A(i-2,j-1)+A(i-2,j+1))-(2\times A(i+2,j)+A(i+2,j-1)+A(i+2,j+1))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1));$$

the first edge enhancement value Enhance_V of the longitudinally rough edge is determined according to:

$$\text{Enhance\_V}=2\times(2=A(i,j)+A(i-1,j)+A(i+1,j))-(2\times A(i,j-2)+A(i-1,j-2)+A(i+1,j-2))-(2\times A(i,j+2)+A(i-1,j+2)+A(i+1,j+2))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1));$$

the first edge enhancement value Enhance_X of the rough edge in the 45-degree direction is determined according to:

$$\text{Enhance\_X}=2\times(2\times A(i,j)+A(i-1,j+1)+A(i+1,j-1))-(2\times A(i-1,j-1)+A(i-2,j)+A(i,j-2))-(2\times A(i+1,j+1)+A(i,j+2)+A(i+2,j));\text{ and}$$

the first edge enhancement value Enhance_Y of the rough edge in the 135-degree direction is determined according to:

$$\text{Enhance\_Y}=2\times(2\times A(i,j)+A(i-1,j-1)+A(i+1,j+1))-(2\times A(i-1,j+1)+A(i-2,j)+A(i,j+2))-(2\times A(i+1,j-1)+A(i,j-2)+A(i+2,j)).$$

7. The method of claim 6, wherein obtaining the first edge enhancement result of the pixel according to the first edge enhancement value of the pixel comprises:
 if the pixel is at the horizontally rough edge, determining the first edge enhancement result A(i,j)_OUT according to:

$$A(i,j)\_\text{OUT}=A(i,j)+K\times\text{Enhance\_H};$$

if the pixel is at the longitudinally rough edge, determining the first edge enhancement result A(i,j)_OUT according to:

$$A(i,j)\_\text{OUT}=A(i,j)+K\times\text{Enhance\_V};$$

if the pixel is at the rough edge in the 45-degree direction, determining the first edge enhancement result A(i,j)_OUT according to:

$$A(i,j)\_\text{OUT}=A(i,j)+K\times\text{Enhance\_X};\text{ and}$$

if the pixel is at the rough edge in the 135-degree direction, determining the first edge enhancement result A(i,j)_OUT according to:

$$A(i,j)\_\text{OUT}=A(i,j)+K\times\text{Enhance\_Y};$$

where K is a predetermined enhancement coefficient.

8. The method of claim 2, wherein obtaining the second gradient value of the pixel comprises:
 generating the second horizontal gradient value and the second longitudinal gradient value of the pixel respectively according to the second matrix.

9. The method of claim 8, wherein:
the second matrix is a 3×3 matrix;
the second horizontal gradient value H1 of the pixel is determined according to:

$$H1=|(2\times A(i,j)+A(i,j-1)+A(i,j+1))-(2\times A(i-1,j)+A(i-1,j-1)+A(i-1,j+1))|+|(2\times A(i,j)+A(i,j-1)+A(i,j+1))-(2\times A(i+1,j)+A(i+1,j-1)+A(i+1,j+1))|;\text{ and}$$

the second longitudinal gradient value V1 of the pixel is determined according to:

$$V1=|(2\times A(i,j)+A(i-1,j)+A(i+1,j))-(2\times A(i,j-1)+A(i-1,j-1)+A(i+1,j-1))|+|(2\times A(i,j)+A(i-1,j)+A(i+1,j))-(2\times A(i,j+1)+A(i-1,j+1)+A(i+1,j+1));$$

where A(i,j) is the pixel value of the pixel P(i,j), A(i−1,j), A(i−1,j−1), A(i−1,j+1), A(i,j−1), A(i,j−2), A(i,j+1), A(i+1,j), A(i+1, j−1) and A(i+1,j+1) are the pixel values of other pixels in the second matrix.

10. The method of claim 9, wherein determining whether the pixel is at the tiny edge according to the second gradient value of the pixel comprises:
 if the second horizontal gradient value H1 of the pixel is larger than a sum of the second longitudinal gradient value V1 and a first predetermined tiny threshold, and larger than a second predetermined tiny threshold, the pixel is determined as being at a horizontally tiny edge; and
 if the second longitudinal gradient value V1 of the pixel is larger than a sum of the second horizontal gradient value H1 and the first predetermined tiny threshold, and larger than the second predetermined tiny threshold, the pixel is determined as being at a longitudinally tiny edge.

11. The method of claim 10, wherein
the second edge enhancement value Enhance_H1 of the horizontally tiny edge is determined according to:

$$\text{Enhance\_H1}=2\times(2\times A(i,j)+A(i,j-1)+A(i,j+1))-(2\times A(i-2,j)+A(i-2,j-1)+A(i-2,j+1))-(2\times A(i+2,j)+A(i+2,j-1)+A(i+2,j+1))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1));\text{ and}$$

the second edge enhancement value Enhance_V1 of the longitudinally tiny edge is determined according to:

$$\text{Enhance\_V1}=2\times(2\times A(i,j)+A(i-1,j)+A(i+1,j))-(2\times A(i,j-2)+A(i-1,j-2)+A(i+1,j-2))-(2\times A(i,j+2)+A(i-1,j+2)+A(i+1,j+2))+A(i,j)-1/8\times(A(i-1,j-1)+A(i+1,j-1)+A(i-1,j+1)+A(i+1,j+1)+A(i-1,j)+A(i+1,j)+A(i,j-1)+A(i,j+1)).$$

12. The method of claim 11, wherein obtaining the second edge enhancement result of the pixel according to the second edge enhancement value of the pixel comprises:

if the pixel is at the horizontally tiny edge, determining the second edge enhancement result A(i,j)_OUT according to:

$A(i,j)\_OUT = A(i,j) + K \times \text{Enhance}\_H1$; and if the pixel is at the longitudinally tiny edge, determining the second edge enhancement result A(i,j)_OUT according to:

$A(i,j)\_OUT = A(i,j) + K \times \text{Enhance}\_V1$;

where K is a predetermined enhancement coefficient.

13. A device for enhancing an edge of an image, comprising:
a first detecting module, configured to obtain a first gradient value of a pixel of the image;
a second detecting module, configured to obtain a second gradient value of the pixel of the image;
a determining module, connected with the first detecting module and the second detecting module respectively, and configured to determine whether the pixel is at a rough edge according to the first gradient value of the pixel and to determine whether the pixel is at a tiny edge according to the second gradient value of the pixel;
an obtaining module, connected with the determining module, and configured to obtain an edge enhancement value of the pixel according to an determining result of the determining module; and
an enhancing module, connected with the obtaining module, and configured to obtain an edge enhancement result of the pixel according to the edge enhancement value of the pixel.

14. The device of claim 13, wherein
the first gradient value of the pixel comprises a first horizontal gradient value, a first longitudinal gradient value, a gradient value in a 45-degree direction, and a gradient value in a 135-degree direction; and
the second gradient value of the pixel comprises a second horizontal gradient value, and a second longitudinal gradient value.

15. The device of claim 14, wherein the first detecting module comprises:
a first establishing unit, configured to establish a first matrix by taking the pixel of the image as a center; and
a first generating unit, connected with the first establishing unit, and configured to generate the first horizontal gradient value, the first longitudinal gradient value, the gradient value in the 45-degree direction and the gradient value in the 135-degree direction respectively according to the first matrix.

16. The device of claim 15, wherein the second detecting module comprises:
a second establishing unit, configured to establish a second matrix by taking the pixel of the image as a center, in which a number of pixels in the first matrix is larger than that in the second matrix; and
a second generating unit, connected with the second establishing unit, and configured to generate the second horizontal gradient value and the second longitudinal gradient value respectively according to the second matrix.

17. The device of claim 14, wherein the determining module comprises:
a first determining unit, configured to determine whether the pixel is at the rough edge according to the first horizontal gradient value, the first longitudinal gradient value, the gradient value in the 45-degree direction the gradient value in the 135-degree direction, a first predetermined rough threshold and a second predetermined rough threshold; and
a second determining unit, configured to determine whether the pixel is at the tiny edge according to the second horizontal gradient value and the second longitudinal gradient value of the pixel, and a first predetermined tiny threshold and a second predetermined tiny threshold.

18. The device of claim 17, wherein the first determining unit is further configured to:
determine the pixel is at a horizontally rough edge, if the first horizontal gradient value of the pixel is larger than a sum of the first longitudinal gradient value and the first predetermined rough threshold, and larger than the second predetermined rough threshold;
determine the pixel is at a longitudinally rough edge, if the first longitudinal gradient value of the pixel is larger than a sum of the first horizontal gradient value and the first predetermined rough threshold, and larger than the second predetermined rough threshold;
determine the pixel is at a rough edge in the 45-degree direction, if the gradient value in the 45-degree direction is larger than a sum of the gradient value in the 135-degree direction and the first predetermined rough threshold, and larger than the second predetermined rough threshold; and
determine the pixel is at a rough edge in the 135-degree direction, if the gradient value in the 135-degree direction is larger than a sum of the gradient value in the 45-degree direction and the first predetermined rough threshold, and larger than the second predetermined rough threshold.

19. The device of claim 17, wherein the second determining unit is further configured to:
determine the pixel is at a horizontally tiny edge, if the second horizontal gradient value of the pixel is larger than a sum of the second longitudinal gradient value and the first predetermined tiny threshold, and larger than the second predetermined tiny threshold; and
determine the pixel is at a longitudinally tiny edge, if the second longitudinal gradient value of the pixel is larger than a sum of the second horizontal gradient value and the first predetermined tiny threshold, and larger than the second predetermined tiny threshold.

20. A digital camera containing a device according to claim 13, further comprising:
a switch, connected with the device for enhancing the edge of the image; and
a register, connected with the switch, and configured to control the switch to turn on or off.

* * * * *